(12) United States Patent
Fulayter et al.

(10) Patent No.: US 9,708,914 B2
(45) Date of Patent: Jul. 18, 2017

(54) GAS TURBINE ENGINE AIRFLOW MEMBER HAVING SPHERICAL END

(71) Applicants: Rolls-Royce Corporation, Indianapolis, IN (US); Rolls-Royce North American Technologies, Inc., Indianapolis, IN (US)

(72) Inventors: Roy D Fulayter, Avon, IN (US); Daniel K Vetters, Indianapolis, IN (US); Bronwyn Power, Brownsburg, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 727 days.

(21) Appl. No.: 14/099,519

(22) Filed: Dec. 6, 2013

(65) Prior Publication Data

US 2014/0255188 A1    Sep. 11, 2014

Related U.S. Application Data

(60) Provisional application No. 61/775,635, filed on Mar. 10, 2013.

(51) Int. Cl.
*F01D 5/12* (2006.01)
*F01D 17/16* (2006.01)
*F04D 29/56* (2006.01)

(52) U.S. Cl.
CPC ............. *F01D 5/12* (2013.01); *F01D 17/162* (2013.01); *F04D 29/563* (2013.01); *Y02T 50/671* (2013.01)

(58) Field of Classification Search
CPC . F01D 5/12; F01D 5/141; F01D 5/143; F01D 7/00; F01D 7/02; F01D 17/162; F01D 17/167; F04D 29/563
See application file for complete search history.

(56) References Cited

U.S. PATENT DOCUMENTS 1,720,695 A    7/1929   Schmidt
1,891,948 A   12/1932   Rice
(Continued)

FOREIGN PATENT DOCUMENTS

GB    705150 A    3/1954
GB   1276720 A    6/1972

OTHER PUBLICATIONS

International Search Report and Written Opinion, International Application No. PCT/US2013/073531, Jul. 23, 2014, 11 pages.

*Primary Examiner* — Craig Kim
*Assistant Examiner* — Brian P Wolcott
(74) *Attorney, Agent, or Firm* — Barnes & Thornburg LLP

(57) ABSTRACT

A gas turbine engine airflow member is disclosed having spherical interface shapes at a tip end and a hub end. In one embodiment, the airflow member is a fan blade. The spherical interface shapes can be convex or concave. In one form, the tip end spherical shape is axially shifted aft relative to a hub end. The tip end can include relatively little forward portion in an expanding flow path with predominant portion of the tip end in a contracting flow path. Such a configuration can occur with a midpoint and trailing edge located in the contracting flow path. A center of gravity of a swept airflow member having spherical end shape can be located on a pivot axis of the airflow member. Divot depressions can be provided to permit concave flow path shapes.

4 Claims, 5 Drawing Sheets

(56) References Cited

U.S. PATENT DOCUMENTS

| | | | |
|---|---|---|---|
| 2,651,496 A | | 9/1953 | Buckland et al. |
| 2,894,318 A | | 7/1959 | Bloomberg |
| 2,919,890 A | | 1/1960 | Smith et al. |
| 3,074,689 A | | 1/1963 | Chapman |
| 3,687,569 A | * | 8/1972 | Klompas .................. F01D 7/00 415/140 |
| 3,695,777 A | | 10/1972 | Westphal et al. |
| 3,887,297 A | | 6/1975 | Welchek |
| 3,992,127 A | | 11/1976 | Booher, Jr. et al. |
| 4,417,854 A | | 11/1983 | Cain et al. |
| 4,420,288 A | | 12/1983 | Bischoff |
| 4,492,521 A | | 1/1985 | Pask et al. |
| 4,732,538 A | | 3/1988 | Wollenweber et al. |
| 4,767,270 A | | 8/1988 | Seidel |
| 4,968,217 A | * | 11/1990 | Newton .................. B64C 11/32 416/147 |
| 5,108,256 A | | 4/1992 | Herbst et al. |
| 6,602,049 B2 | * | 8/2003 | Caubet .................. F01D 5/143 415/160 |
| 8,075,253 B2 | | 12/2011 | Bertino |
| 2011/0064580 A1 | | 3/2011 | Barnes et al. |
| 2014/0140822 A1 | * | 5/2014 | Capozzi .................. F01D 9/00 415/160 |

* cited by examiner

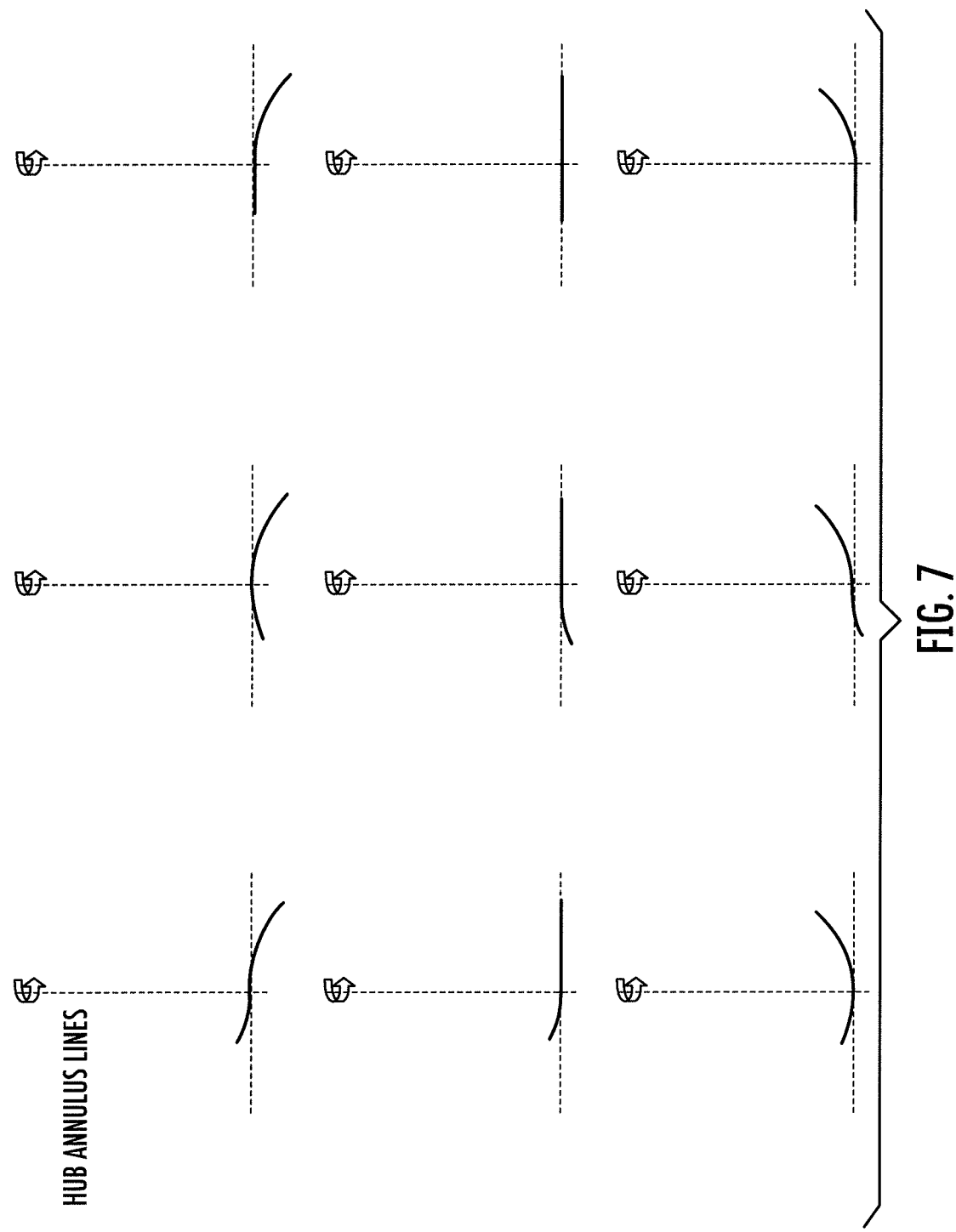

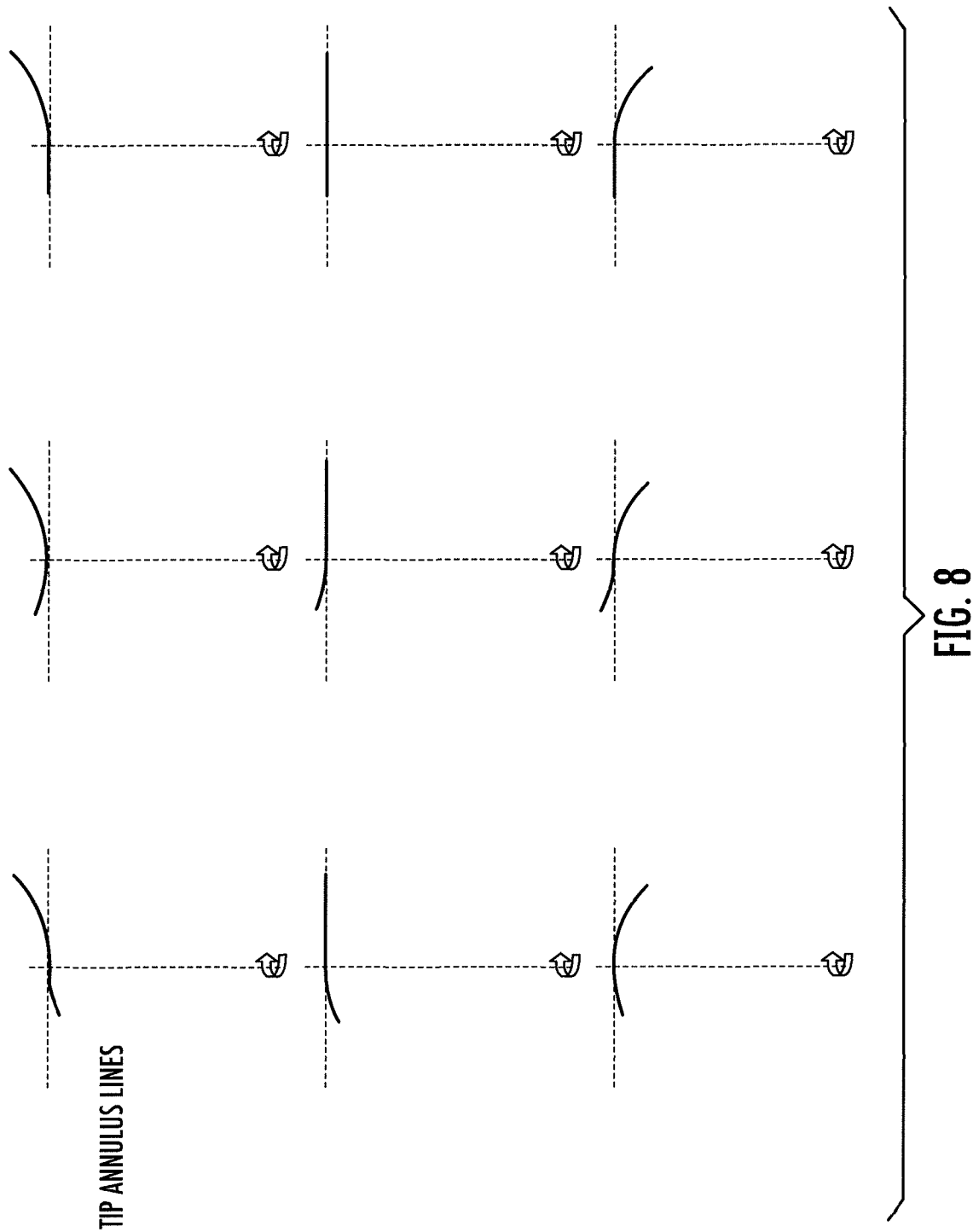

GAS TURBINE ENGINE AIRFLOW MEMBER HAVING SPHERICAL END

CROSS REFERENCE TO RELATED APPLICATIONS

This application claims priority to and the benefit of U.S. Provisional Patent Application No. 61/775,635, filed 10 Mar. 2013, the disclosure of which is now expressly incorporated herein by reference.

TECHNICAL FIELD

The present disclosure generally relates to gas turbine engine airflow members having tip clearance features. More particularly, but not exclusively, the present disclosure relates to tip clearance using spherical shapes.

BACKGROUND

Providing consistent and small tip clearance in gas turbine engine airflow members remains an area of interest. Some existing systems have various shortcomings relative to certain applications. Accordingly, there remains a need for further contributions in this area of technology.

SUMMARY

One embodiment of the present disclosure is a unique gas turbine engine airflow member. Other embodiments include apparatuses, systems, devices, hardware, methods, and combinations for maintaining small tip clearances over a range of operating conditions of a gas turbine engine airflow member. Further embodiments, forms, features, aspects, benefits, and advantages of the present application shall become apparent from the description and figures provided herewith.

BRIEF DESCRIPTION OF THE FIGURES

FIG. 7 depicts various embodiments of hub interface shapes;
and
FIG. 8 depicts various embodiments of tip interface shapes.

DETAILED DESCRIPTION OF THE ILLUSTRATIVE EMBODIMENTS

Figure 1:
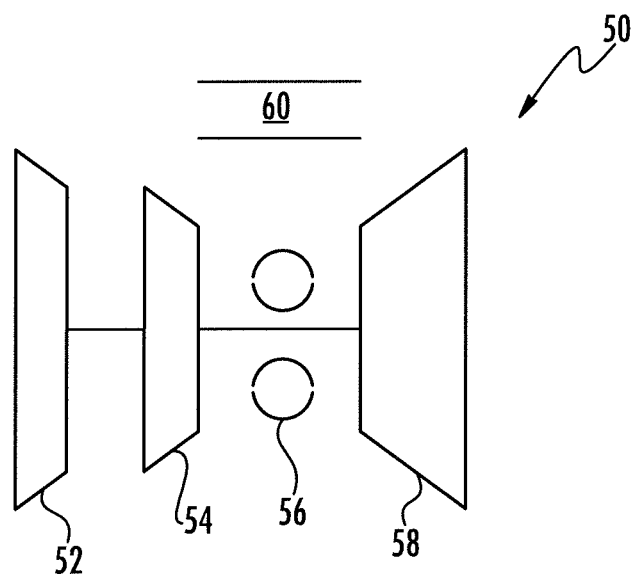
FIG. 1 depicts one embodiment of a gas turbine engine.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, one embodiment of a gas turbine engine 50 is depicted which includes a fan 52, a compressor 54, a combustor 56, and a turbine 58. Air is received into and compressed by the compressor 54 prior to being delivered to the combustor 56 where it is mixed with fuel and burned. A flow of air and products of combustion is then delivered to the turbine 58 which expands the flow stream and produces work that is used to drive the compressor 54 as well as to drive the fan 52. The fan 52 is used to develop thrust by accelerating air through a bypass passage 60 which is exhausted out of the rear of the engine 50.

The gas turbine engine can be used to provide power to an aircraft and can take any variety of forms. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosures are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Though the engine 50 is depicted as a single spool engine, other embodiments can include additional spools. The embodiment of the engine 50 depicted in FIG. 1 is in the form of a turbofan engine, but it will be appreciated that some embodiments of the gas turbine engine can take on other forms such as, but not limited to, open rotor, turbojet, turboshaft, and turboprop. In some forms, the gas turbine engine 50 can be a variable cycle and/or adaptive cycle engine.

Figure 2:
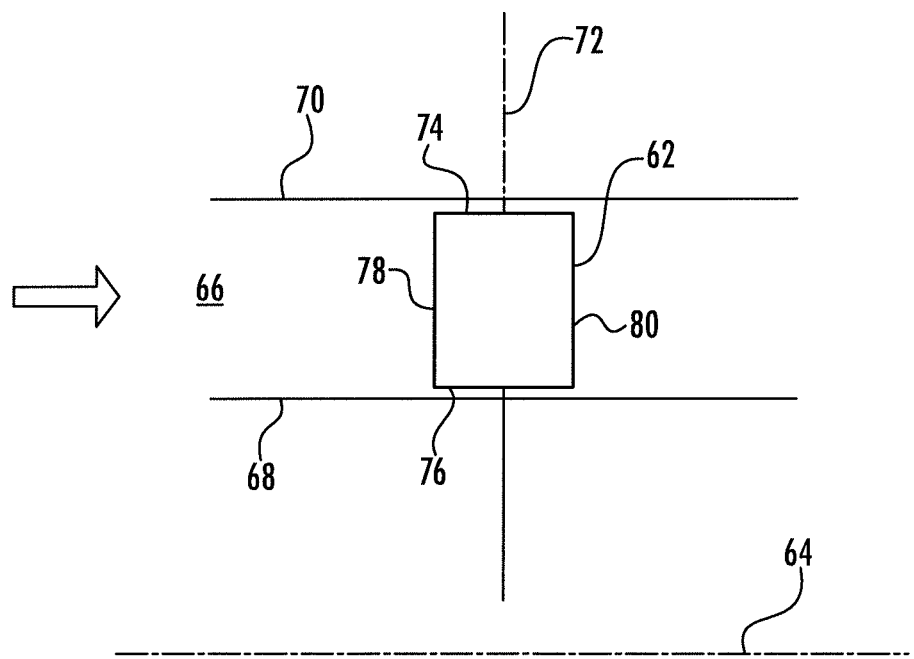
FIG. 2 depicts one embodiment of an airflow member.

Turning now to FIG. 2, an airfoil member 62 that can be used in the turbomachinery components of the gas turbine engine 50 is depicted. The airfoil member 62 is an airfoil shaped elongate component that extends across a flow path of the turbomachinery component and which can be used to operate upon a fluid traversing the flow path, such as by changing a direction and/or pressure of the fluid travelling through the flow path.

The embodiment of the airfoil member 62 depicted in FIG. 2 is in the form of a rotatable blade capable of being rotated around the centerline 64, but in other embodiments it will be appreciated that the airfoil member 62 may take the form of the stator vane. The airfoil member 62 is disposed in a flowpath 66 formed between an inner wall 68 and an outer wall 70 and is capable of being rotated to a pitch angle about the axis 72. The flowpath 66 can be an annular flow path in many embodiments. The airfoil member includes a tip end 74 disposed adjacent the outer wall 70, and a hub end 76 disposed adjacent the inner wall 68.

The inner wall 68, outer wall 70, tip end 74, and hub end 76 are illustrated for purposes of convenience as straight lines, but as will be discussed further below one or more of the walls 68, 70 and ends 74, 76 will have a spherical shape to provide for a substantially constant clearance over a wide range of pivoting action of the airfoil member 62. To set forth just one non-limiting example, the outer wall 70 and tip end 74 can have complementary spherical shapes, while the inner wall 68 and hub end 76 do not. It is also possible for both outer and inner walls 70, 68 to have spherical shapes. As used herein, the term "spherical" will be understood to include those shapes that are substantially spherical to provide for a substantially constant clearance over the wide range of pivoting the action of the airfoil member 62. To set forth just a few non-limiting examples, some variation in the shape of the interface will be recognized for manufacturing tolerances and service wear.

The spherical shape at the tip and hub ends of the airfoil member 62 can be concave or convex on either or both tip and hub. For example, in the embodiment depicted in FIG. 2, the tip end of the airfoil member 62 can have a convex shape such that the flow path extends up and away from the hub end 76 at a leading edge 78 of the airfoil member before reaching an apex and descending back towards the hub and 76 at a trailing edge 80 of the airfoil member 62. Various other possibilities will be appreciated from this singular example. For example, the tip end 74 can have a concave shape, the hub end 76 can have a convex shape, and the hub end 76 in other embodiments can have a concave shape. Thus, any variation of concave and convex shapes can be used on either or both of the tip end 74 and hub end 76. Furthermore, the ends 74, 76 can both be either a concave or convex shape, while in other embodiments one of the ends 74, 76 can be concave while the other of the ends 74, 76 can be convex.

The relative placement of the concave and convex shape will determine whether the shape is extending away from or toward the centerline 64. For example, if the outer wall 70 is concave, part of that surface may extend away from the centerline while another part is extending toward the centerline. Such a situation is present when the outer wall 70 is at the same radial distance from the centerline 64 on both sides of the concave spherical shape.

Separate and apart from the shape of the walls 68 and 70 and whether or not the walls are extending toward or away from the centerline 64, the area of the flow path annulus can also be increasing or decreasing due in large part to the interdependent nature of flow path area with outer radius and inner radius. In various embodiments, the cross sectional area may be increasing or decreasing as a function of axial location depending on the relative nature of the spherical shapes at one or both of the walls 68 and 70. No limitation on the nature of the cross sectional area is intended unless expressly stated to the contrary.

Though the airfoil member 62 is shown for convenience as a quadrilateral, it will be appreciated that the airfoil member 62 can have any variety of characteristics associated with any number of airfoil members used in gas turbine engines. For example, the airfoil member 62 can include sweep, lean, twist, etc. Furthermore, the airfoil member 62 can have any variety of orientations of its characteristics (sweep, lean, twist, etc) relative to any variety of features (e.g. pivot axis, leading and trailing edges, etc) of the airfoil member 62. For example, the tip end 74 and the hub end 76 can be located relative to the axis 72 such that a greater proportion of either of the tip and 74 or the hub end 76 is disposed either forward or aft of the axis 72. Other embodiments will be described further below.

The spherical shape can occur in any range between the leading edge 78 and trailing edge 80 including the entire range between leading and trailing edge. In some forms, a spherical shape can be located between the leading edge and a point between the leading edge and trailing edge (e.g. a pivot point between the leading edge and trailing edge), and another spherical shape with a different radius can be located between the midpoint and the trailing edge. In fact, the different spherical shapes can be a mixture of concave and convex spherical shapes. To set forth just one non-limiting example, the forward spherical shape can be concave and the aft spherical shape can be convex. FIGS. 7 and 8 set forth a few non-limiting examples of having spherical shapes forward and aft of the pivot axis, whether the shapes are a mixture of concave, convex, or wholly concave or convex. The shapes can have the same or different radii. The arrow indicates rotation about the axis in either direction. The various figures also illustrate a combination of spherical shapes and linear shapes that also produce very little gap when the member is pivoted about the axis. The straight line, or linear, segments can be either forward or aft of the pivot axis, or both forward and aft. It will be appreciated that any particular hub side geometry depicted in any of the nine separate variations of FIG. 7 can be paired with any particular tip side geometry depicted in any of the nine separate variations in FIG. 8.

Figure 3:
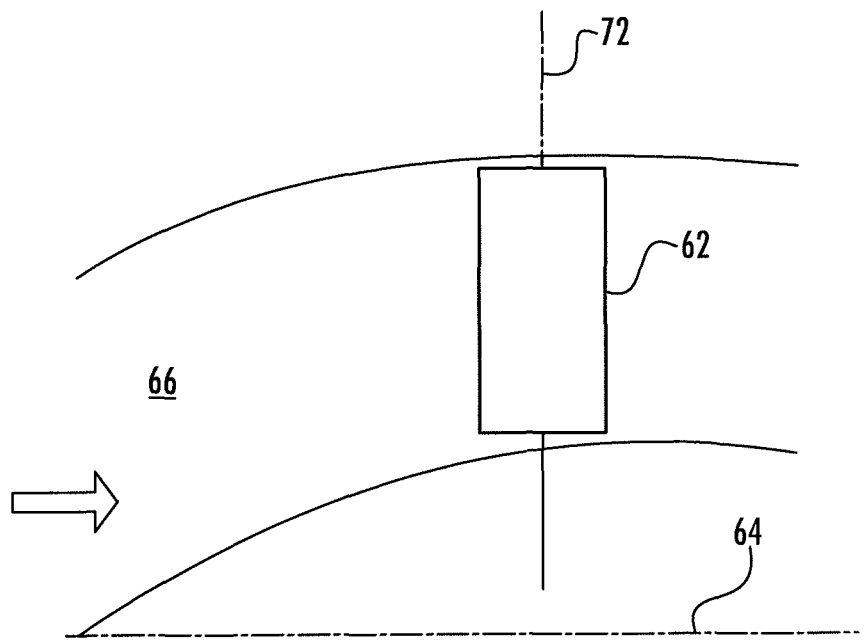
FIG. 3 depicts another embodiment of an airflow member.

Turning now to FIG. 3, one embodiment of the airfoil member is shown as a fan blade 62 capable of pivoting about axis 72 and rotatable about the centerline 64. The flowpath 66 is bounded by a hub that generally extends away from the centerline 64 at an upstream end until reaching an apex before descending towards the centerline 64. The fan blade 62 is depicted as being located near an apex of the hub, but in other forms the fan blade 62 can be located further forward on the hub or further aft.

Figures 4A, 4B:
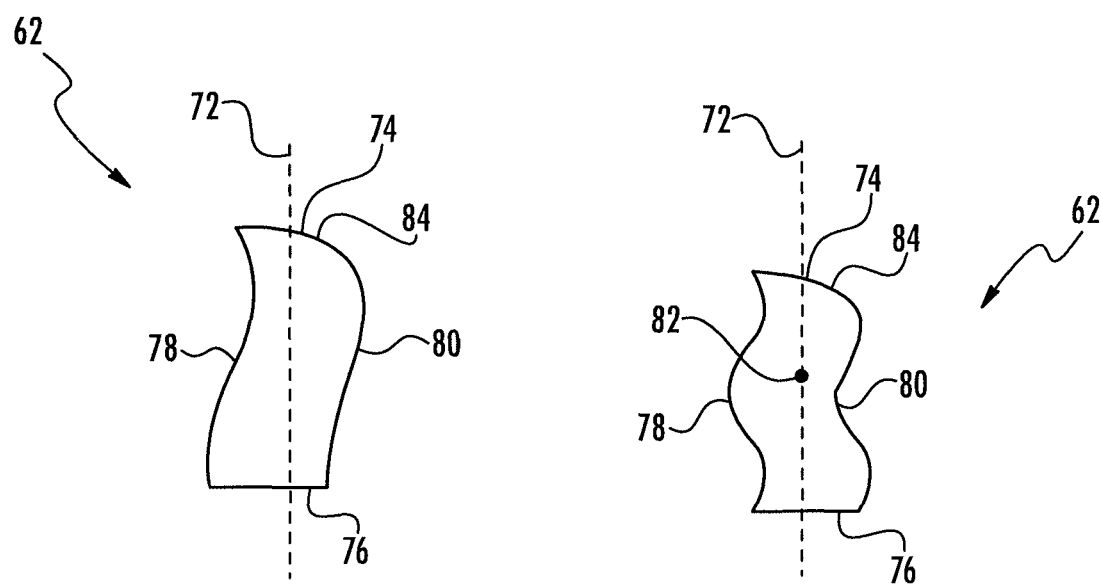
FIGS. 4A and 4B depict embodiments of an airflow member.

Turning now to FIGS. 4A and 4B, two separate embodiments of the fan blades 62 are depicted, both of which include a spherical tip end 74. Each of the fan blades 62 illustrated in FIG. 4A and FIG. 4B include compound sweep distributions with the primary difference being that the embodiment in FIG. 4A includes a rearward sweep near the hub end 76 and a forward sweep at the tip end 74, while the embodiment and FIG. 4B initially includes a rearward sweep at the hub followed by successive forward sweep, rearward sweep, and finally forward sweep at the tip. Another difference is that the axis 72 of the embodiment depicted in FIG. 4B passes through a center of gravity 82 of the fan blade 62.

While both embodiments depict compound sweep distributions, other forms of the fan blade 62 could consist of backward sweep only.

Turning now to some similarities between FIG. 4A and FIG. 4B, it will be noted that the tip in 74 is shifted axially aft relative to the hub and 76. For example, the leading edge of the tip end 74 is shifted back axially relative to the leading edge of the hub in the 76. The arrangement depicted in FIG. 4A and FIG. 4B also permits the spherical shape at the tip end 74 to have mostly contraction which permits higher fan pressure ratios for a given diameter relative to a flowpath with lesser contraction. A descending flow path can also minimize engine length, and thus engine weight, because the S-duct downstream of the fan blade 62 can be shorter and the core vane, sometimes referred to as the ESS, can be on a descending flow path. Having the ESS on the descending flow path can reduce the extreme radius change in the S-duct given that the starting radius is reduced.

The spherical shape at the tip end 74 includes an apex at the axis 72. Given that the pivot axis 72 is located towards the leading edge 78 forward of a midpoint between the leading edge 78 and the trailing edge 80, the portion of the spherical shape located between the leading edge 78 and the pivot axis 72 is smaller relative to the portion of the spherical shape located between the pivot axis 72 and the trailing edge 80. The midpoint 84 can represent half the arc distance of the spherical shape at the tip end 74 between the leading edge 78 and trailing edge 80.

In one embodiment of the fan blade 62 illustrated in FIGS. 4A and 4B, several aerodynamic considerations can be taken into account improve operation. For example, the fan hub pressure ratio can be limited to avoid separating the flow at the trailing edge 80 of the fan blade 62. To accommodate this, all of the turning of the flow in the hub region near the leading edge 78 can be accomplished and negative camber can be included in the airfoil to keep airflow attached at the trailing edge.

Figure 5:
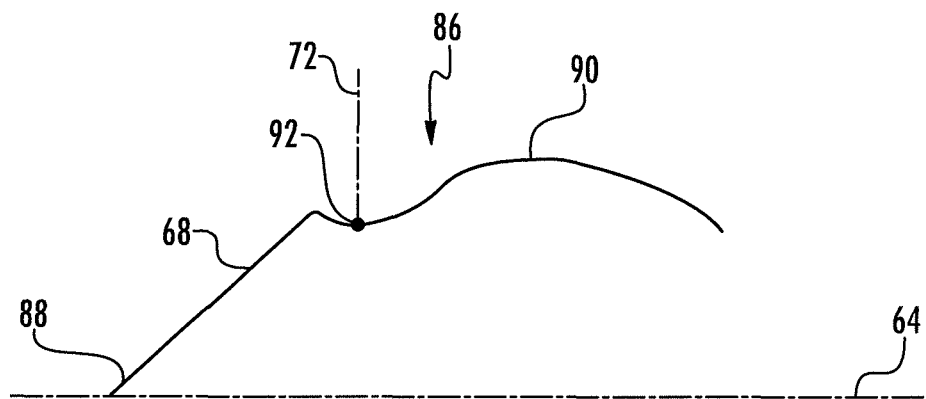
FIG. 5 depicts an embodiment of a divot depression.

FIG. 5 depicts an embodiment of the inner wall 68 in the form of a turbofan spinner having a divot depression 86 formed downstream of a tip 88 of the spinner. The divot depression 86 can include a spherical shape as will be appreciated given some of the discussion above. The divot depression 86 is formed upstream of an apex 90 associated with the turbofan flowpath, but it will be appreciated that the divot depression 86 can be formed in any variety of locations including at the apex 90 and downstream of it. The divot depression 86 includes a spherical shape size to receive a complementary circle shaped hub end 76 of a fan blade 62 (not shown). Also depicted in FIG. 5 is a pivot point 92 through which the axis 72 extends. The pivot 92 is shown located in a relatively forward portion of the divot depression 86, but in other embodiments the pivot 92 can be placed in other locations of the divot depression 86. In addition, the axis 72 is illustrated at a right angle to the centerline 64, but in other embodiments the axis 72 can be oriented at other angles relative to the centerline 64.

Figure 6A:
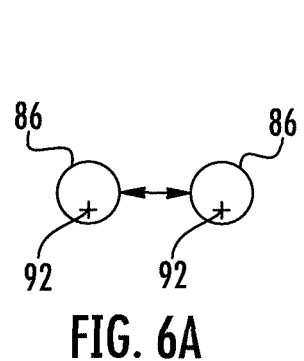
FIGS. 6A and 6B depict embodiments of divot depressions.
Figure 6B:
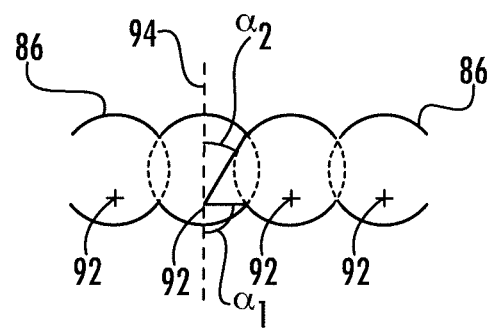

Turning now to FIGS. 6A and 6B, two separate embodiments are shown of a gas turbine engine having a plurality of divots 86 disposed circumferentially about an annular flow path. The embodiment depicted in FIG. 6A illustrates divot depressions 86 separated by a distance that can be referred to as a pitch. The distance, or pitch, between divot depressions 86 can be determined based upon solidity of airfoil members 62, among other things. Though the divot depressions 86 are not limited to any particular form of the airflow member 62, in one non-limiting embodiment the divot depressions 86 are used with a fan blade 62 at the hub location that suggested above in FIG. 5.

FIG. 6B illustrates divot depressions 86 that are spaced close enough together such that the divot depressions 86 overlap one another. The dashed lines depicted in FIG. 6B illustrate what would be nominal contour lines of respective divot depressions 86 were it not for the overlap with a neighboring divot depression 86. Overlapping divot depressions 86 may occur when solidity is greater than 1.0. Two separate angles are also illustrated in FIG. 6B. An angle $\alpha_1$ illustrates an angle measured from the pivot 92 between a reference axis 94 and a location that a leading edge 78 of the airflow member 62 would intersect a forward divot overlap between adjacent divot depressions 86. Likewise, angle $\alpha_2$ illustrates an angle measured from the pivot 92 between a reference axis 94 and a location that a trailing edge 80 of the airflow member 62 would intersect an aft divot overlap between adjacent divot depressions 86. The reference axis 94 can be any axis useful to measure divot overlaps, and, in one form, is the centerline 64. The angles $\alpha_1$ and $\alpha_2$ can be calculated based on solidity, blade count, and pivot axis location to ensure that certain performance critical points have tight clearances between the airfoil member 62 and a surface of the divot depression 86. Operation of the airflow member 62 at a location in which at least portion of it extends past the divot overlap angles is still acceptable at other performance points where inefficiency may be less important. For example, reverse pitch operation for generation of reverse thrust may be an example of operation of the airflow member 62 in which it extends past the divot overlap angle. The angles $\alpha_1$ and $\alpha_2$ can be the same in some embodiment, but will be different in others as shown in the illustrated embodiment. In one particular form, the angles $\alpha_1$ and $\alpha_2$ are different when the pivot point 92, and corresponding axis 72, are placed forward of a mid-chord location of the airflow member 62.

Any of the embodiments disclosed herein of the particular arrangement of the tip can be used with any of the embodiments disclosed herein of the particular arrangement of the hub. For example, axially displacing the tip end 74 relative to the hub in 76 where the tip in 74 includes mostly contraction, and combining that arrangement with the hub end 76 in which the pivot axis is placed in front of the mid chord location at the hub end 76. This combination can include concave or convex vertical shape at the hub end 76. Any variety of other combinations are also contemplated.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:
1. A gas turbine engine comprising
a variable position airfoil member that includes a hub end having a leading edge and a trailing edge, the variable position airfoil member disposed within a flow path annulus adjacent a hub flow path surface having a divot that includes a downstream end in which a radial rate of growth of the downstream end is increasing, the variable position airfoil member pivotable around an adjustment axis and capable of being moved between a first position and a second position where the first position provides a flow area greater than a flow area in the second position, the hub end offset from the divot to permit pivoting movement of the variable position airfoil member without interference from the flow path surface between the first position and the second position, wherein the offset between the flow path surface of the divot and the hub end of the variable position airfoil member is constant as the variable position airfoil member moves between the first position and the second position, wherein the hub end is spherical, the variable position airflow member includes a tip end that is spherical, and the axial extent of spherical shape at the tip end forward of a pivot axis of the variable position airflow member is shifted backward relative to the axial extent of the spherical shape at the hub end forward of the pivot axis.

2. The gas turbine engine of claim 1, wherein one of the tip offset and hub offset includes a first range of pivot angles such that clearance is substantially constant and a second range of pivot angles such that clearance in the second range is variable.

3. The gas turbine engine of claim 2, wherein a forward portion of the variable position airflow member includes a first forward range of pivot angles over which the offset is constant and an aft portion of the airflow member includes a first aft range of pivot angles over which the offset is constant and the first forward range is different than the first aft range.

4. A method comprising
rotating a turbomachinery blade about a centerline of a gas turbine engine, the turbomachinery blade having a spherical shaped end,
pivoting the turbomachinery blade about a pivot axis to swing from a first position to a second position, the spherical shaped end residing in a concave divot depression formed in a flow path surface, the concave divot depression having a spherical shape complementary to the spherical shaped end of the turbomachinery blade,
as a result of the pivoting, sweeping the spherical shaped end of the turbomachinery blade across the complementary spherical shape of the concave divot depression, and
maintaining a substantially constant clearance between the spherical shaped end of the turbomachinery blade and the spherical shape of the concave divot depression,
wherein the pivoting results in at least one of extending a trailing edge of the turbomachinery blade past the divot depression after the turbomachinery blade reaches a first limit angle and extending a leading edge of the turbomachinery blade past the divot depression after the turbomachinery blade reaches a second limit angle.

* * * * *